United States Patent [19]
Miyamoto et al.

[11] Patent Number: 5,752,593
[45] Date of Patent: May 19, 1998

[54] BELT FEEDER CENTERING METHOD AND APPARATUS

[75] Inventors: Yoshinori Miyamoto; Jiro Agawa; Minoru Kimura, all of Nagasaki-ken, Japan

[73] Assignee: Mitsubishi Jukogyo Kabushiki Kaisha, Nagasaki, Japan

[21] Appl. No.: 800,058

[22] Filed: Feb. 14, 1997

[30] Foreign Application Priority Data

Feb. 21, 1996 [JP] Japan ................... 8-033239

[51] Int. Cl.$^6$ ................................... B65G 47/26
[52] U.S. Cl. ........................... 198/456; 198/634
[58] Field of Search ..................... 198/456, 634, 198/785, 786, 836.3

[56] References Cited

U.S. PATENT DOCUMENTS

| | | | |
|---|---|---|---|
| 2,986,262 | 5/1961 | Powers | 198/634 |
| 3,470,997 | 10/1969 | Trounce | 198/634 |
| 4,643,013 | 2/1987 | Blazevic | 198/785 X |
| 5,368,643 | 11/1994 | Kuster | 198/456 X |
| 5,605,215 | 2/1997 | Gross et al. | 198/456 X |

*Primary Examiner*—James R. Bidwell
*Attorney, Agent, or Firm*—Michael N. Meller

[57] ABSTRACT

A method and apparatus are provided for positioning sheets of material on a belt feeder for transporting the material through a cutter toward a tire-processing apparatus. The material has a front-edge portion which is centered by using edge-position control, and side portions which are centered by using center-position control. Also, the material, as cut, will have a rear-edge portion, the centering position of which is controlled by edge-position control.

11 Claims, 6 Drawing Sheets

PRIOR ART

FIG. 6

PRIOR ART

FIG. 7

BELT FEEDER CENTERING METHOD AND APPARATUS

BACKGROUND OF THE INVENTION

The present invention relates to a method and apparatus for a belt feeder. More particularly, the present invention relates to a method and apparatus as applied to a belt feeder used for the molding of tires.

When a belt feeder is utilized for transporting material from one position to another position, particularly via a cutter apparatus, it is important that the material be appropriately centered on the belt feeder. For preparing material for tire molding, for example, the belt feeder transports the material through a cutter member which cuts the material into desired patterns. The patterns of material are then applied from the end of the belt feeder into a tray for attachment which further processes the tire material and brings the same to the tire-molding apparatus.

Conventional methods have been utilized for centering the material being transported along a belt feeder. One method restricts both edges of the material using mechanical guide rollers. Another method restricts only one edge of the material and detects the opposite edge of the material by means of a photoelectric sensor. This arrangement will measure the width fluctuation according to changes in the output voltage of the photoelectric sensor. This arrangement will drive a conveyor in the direction of the width of the material so that the center position of the material will match or coincide with the center position or centerline of the belt roller.

Figure 6:
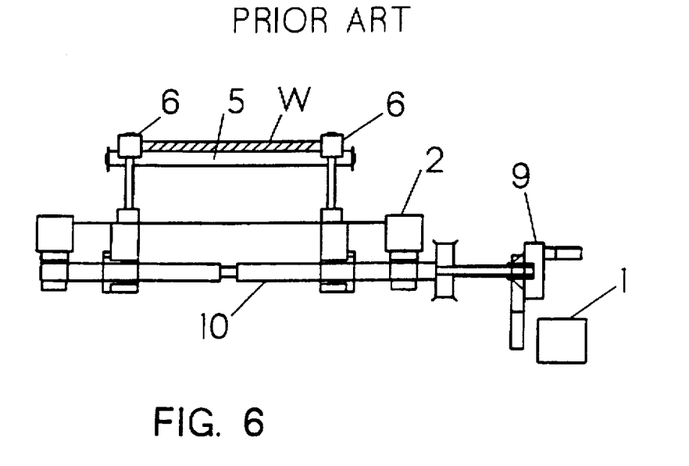
FIG. 6 is a front view of conventional centering apparatus.

Referring to FIG. 6, one such prior art device is shown. FIG. 6 is a front view of conventional centering apparatus. In FIG. 6, a frame 1 is provided having a conveyor 2 mounted thereon. The conveyor 2 is a centering conveyor which can be moved along a threaded shaft 10 by manually rotating the handle 9 arranged at one end of the shaft 10.

The material to be centered is designated by W. This material is supported by a roller 5 and has both edges restricted by a plurality of pairs of vertical guide rollers 6 arranged in the direction perpendicular to the roller 5 to maintain the material at the center position. Accordingly, the type of prior art shown in FIG. 6 restricts the movement of both edges of the material W as it is transported along the belt feeder.

Figure 7:
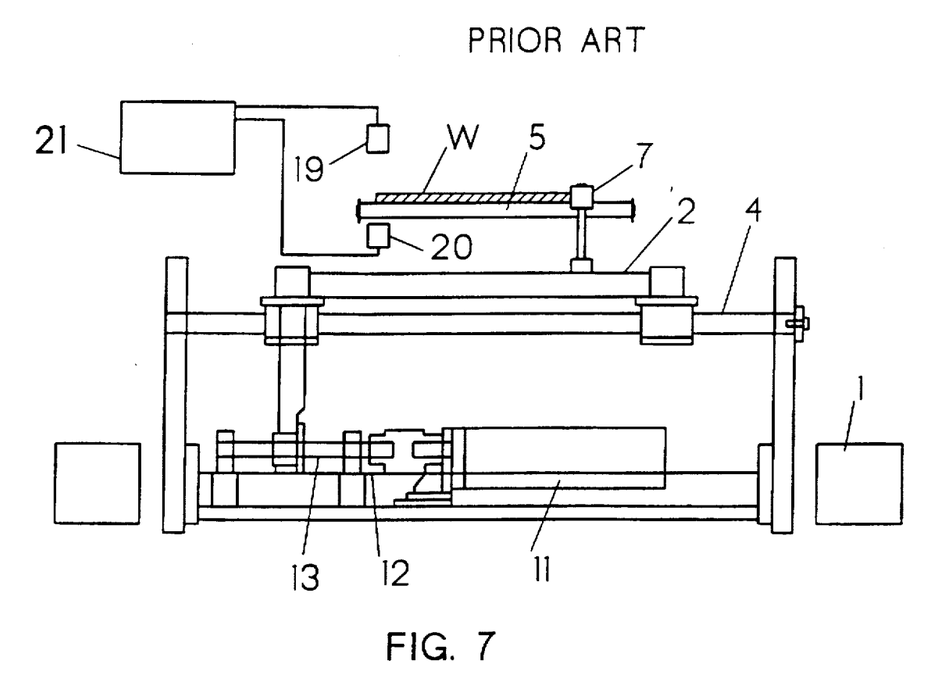
FIG. 7 is a front view of a second conventional centering apparatus.

A second conventional arrangement is shown in FIG. 7, which is a front view of such apparatus. The apparatus illustrated in FIG. 7 again has a roller 5 and a material W, but only one edge of the material W is restricted by a vertical roller 7. The other edge of the material W moves along the path between photodetector elements 19 and 20 arranged above and below the roller 5.

The vertical roller 7 is mounted on a conveyor 2 and may be moved left or right on a guide 4 by the driving means of a servomotor 11. The servomotor 11 rotates a coupling 12 and a rack-and-pinion arrangement 13 for moving the vertical roller 7 as the width of the material W fluctuates. In FIG. 7, a photosensor amplifier 21, coupled to photodetectors 19 and 20, is provided which will produce an output for driving the servomotor 11 in the appropriate direction. In FIG. 7, the photosensor elements 19 and 20 are of the transmittive type. If the sensor 19 is of the reflective type, a reflection plate may be arranged at the position of the photoelectric element 20 instead.

These conventional methods suffer from several difficulties. It is clear that when the mechanical guide-roller arrangement of FIG. 6 is used, for example, if the width of the material is wider than the distance between the rollers, it is very difficult to straighten out the material evenly. When the apparatus uses a photoelectric sensor in order to compensate for the width fluctuation of the material, it is necessary to adjust the photoelectric sensor so as to maintain the material perpendicular to the surface of the conveyor and parallel to the guide roller. Also, when the width of the material is changed, it is also necessary to change the mounting position of the photoelectric sensor. Clearly, there is a further drawback that the photodetector elements or the reflection plate or both always have to kept clean as well.

SUMMARY OF THE INVENTION

It is therefore an object of the present invention to provide a belt-roller centering method and apparatus which will overcome the problems presented by the conventional solutions.

It a further object of the present invention to provide a method and apparatus which senses the overall width of the material over its entire length and which reduces the number of elements that have to be mechanically adjusted when different materials are used.

In accordance with the present invention, a method for centering material on a belt feeder having a center position is provided. The material has side edges and a front-edge portion, and includes the steps of moving the material along a desired path on the belt feeder. Measuring the width of the front-edge portion of the material is carried out at a preselected location along the path using edge-position control. Also, the position coordinates of both side edges are measured at the same preselected location using center-position control after the front-edge portion has moved past such location. The center position of the material is then calculated based on the position coordinates. Finally, the material is moved in a direction to have the center position of the material coincide with the center position of the belt feeder, if such movement is necessary.

In a further method for carrying out the present invention, the material has a rear-edge portion and the width of the rear-edge portion is measured at the same preselected location as the front-edge portion, also using edge-position control when the rear-edge portion reaches the location.

An embodiment of the present invention includes apparatus for centering material on a belt feeder which has a center position. Conveyor means are provided for moving the material along a desired path on the belt feeder. Means for measuring the width of the front-edge portion of the material at a preselected location is provided using edge-position control. Means are also included for measuring the position coordinates of both of the edges of the material using center-position control after the front-edge portion has moved past the measuring location. Means are included for calculating the center position of the material based on the position coordinates of the two edges. Finally, the conveyor is moved in a direction to have the center position of the material coincide with the center position of the belt feeder, if such movement is necessary.

In a further embodiment of the present invention, a cutter is arranged along the path on the belt feeder along which the material moves. The cutter has an entry and an exit side. First guiding means are arranged at the entry side of the cutter for centering the material on the belt feeder, and second guiding means are arranged at the exit side of the cutter for aligning at least one of the side edges of the material along a predetermined path.

BRIEF DESCRIPTION OF THE DRAWINGS

The above and other objects, features, and advantages of the present invention will become more apparent from the following detailed description taken with the accompanying drawings, in which.

DESCRIPTION OF THE PREFERRED EMBODIMENTS

Figure 1:
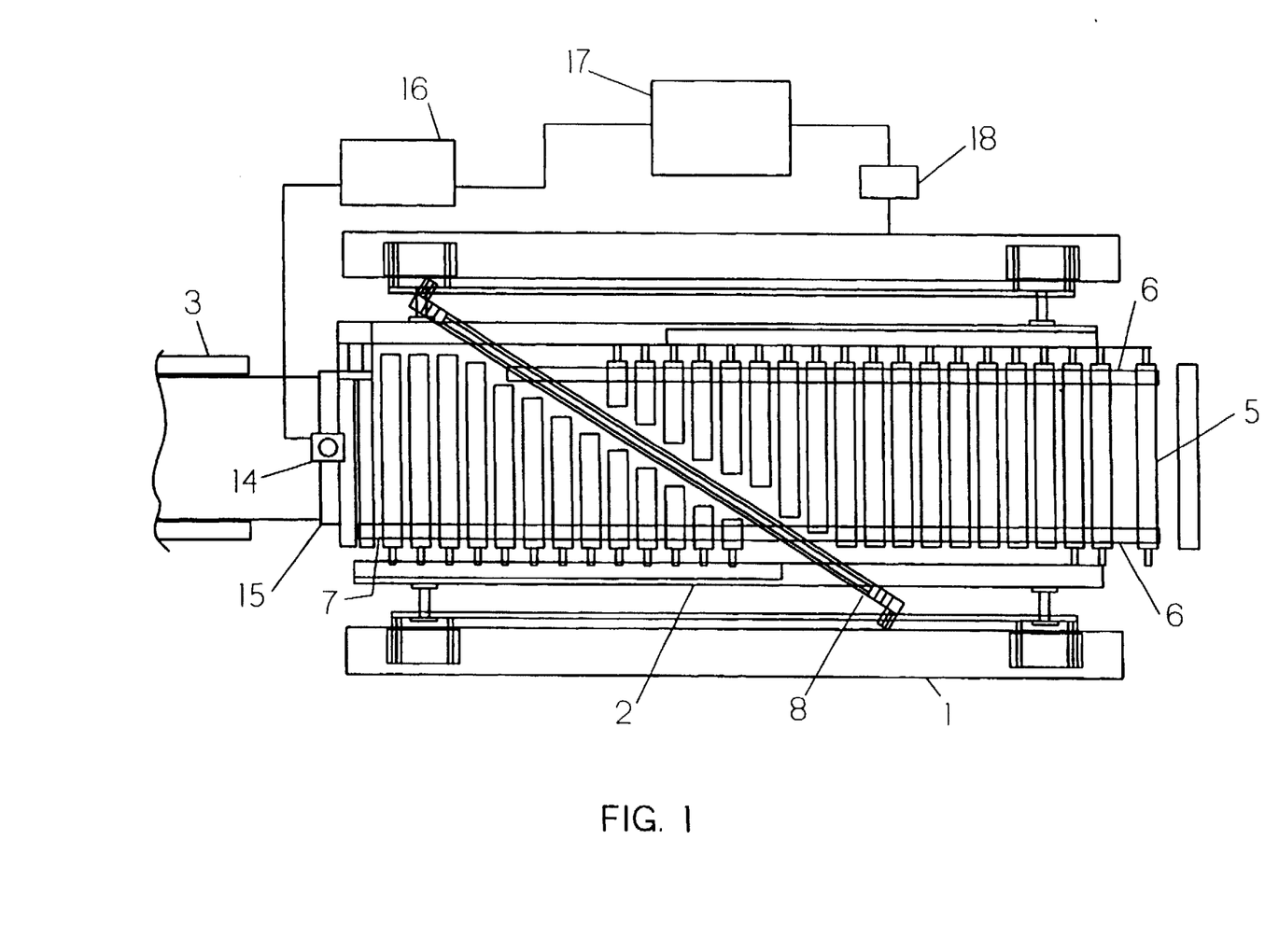
FIG. 1 is a plan view of a preferred embodiment of the centering apparatus incorporating the principles of the present invention.
Figure 2:
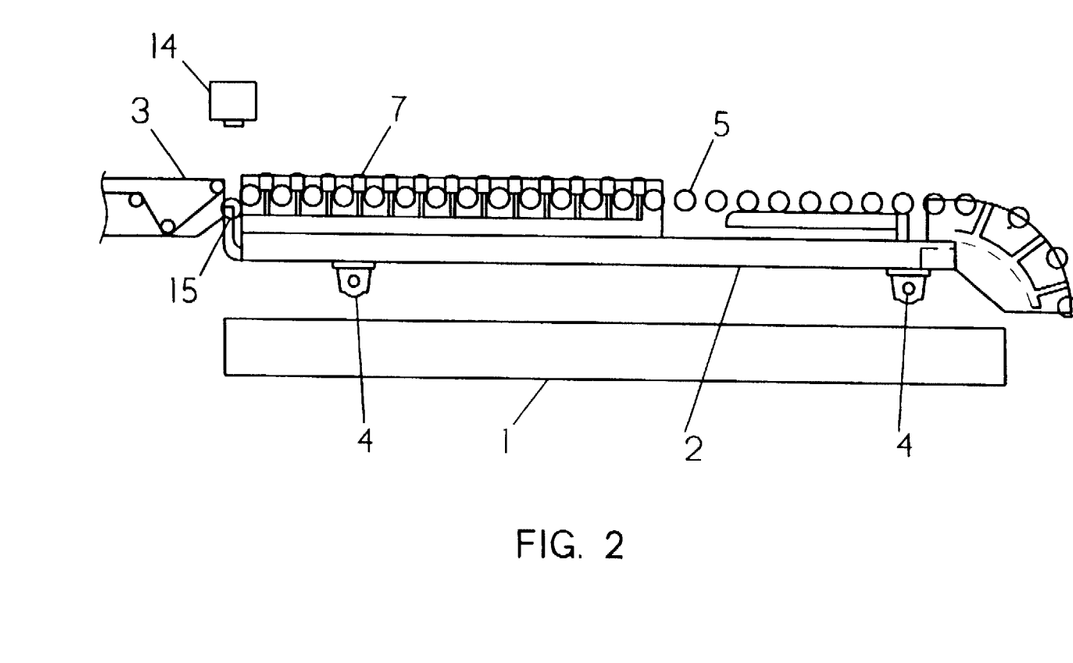
FIG. 2 is a side view of the apparatus of FIG. 1.
Figure 3:
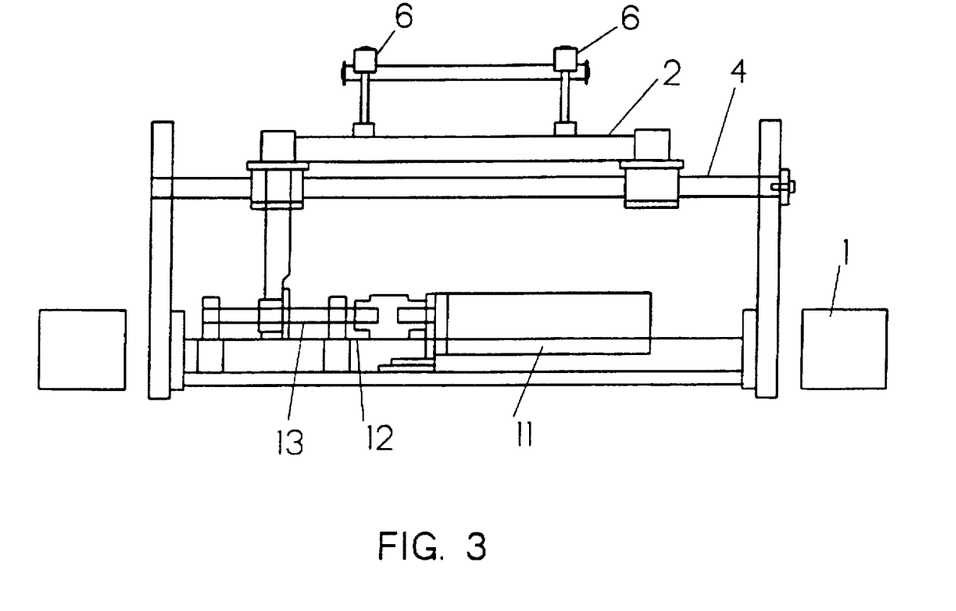
FIG. 3 is a front view of the apparatus of FIG. 1.

Referring to the drawings, and more particularly to FIGS. 1–3, belt material for the tire-molding process is fed from the right side of FIG. 1 along the roller 5 between restricting guide rollers 6. It can be seen that the guide rollers 6 are paired at the right-hand and left-hand sides of the centering conveyor 2, as best seen in FIG. 3. Accordingly, the material is already substantially centered in advance as it moves along the centering conveyor 2. The material is guided to the second guide roller 7, which is arranged at only one edge of the material.

A cutter 8 is arranged substantially diagonally across the belt feeder and has an entry side at the right-hand portion, as shown in FIG. 1, and an exit side at the left-hand portion.

As noted above, it is an object of the present invention to have the center of the material being fed along the belt roller coincide with the center of the belt roller. By "the center of the belt roller" is meant a central axis equidistant between the edges of the roller. Similarly, by "the center position of the material" is meant an axis of the material arranged parallel to the side edges and equidistant from each of the side edges.

After the material leaves the exit side of the cutter 8, it proceeds along the predetermined path toward the tray 3 for attachment, which is a further belt arrangement, best seen in FIG. 2, for taking the cut portions of the material and transporting them further to the tire-molding apparatus.

At the end of the belt roller is a one-dimensional image sensor 14 which is arranged between the centering conveyor 2 and the tray 3 for attachment. The centering conveyor 2 is moved horizontally along the guide 4, as best seen in FIG. 3, by means of a servomotor 11, a coupling 12, and a rack-and-pinion arrangement 13. It is clear that the various elements of all of the figures which are the same are identified by the same numeral.

Instead of using the servomechanism 11, it is evident that the manual control, shown in FIG. 6, can be used for shifting the conveyor along the shaft 4 as well.

The coordinate signals produced from the one-dimensional image sensor 14 is applied to the input of a controller 17 by means of an image sensor amplifier 16. The required movement of the actuator is determined by a calculation process (which will discussed with respect to the flow diagram of FIG. 5) in order to supply the signal to the servoamplifier 18 which controls the motor 11.

The sensor section of the one-dimensional image sensor 14 is a solid-state image component in which 1024, 2048, or 4096 photocells arranged at a constant distance from the material.

Referring to FIG. 4, it can be seen that the material W, having been cut by the cutter 8, has a front-edge portion, shown from points A–B of Subfigure 4(a). The front-edge portion will first move into the location of the photosensor 14 and the varying width will develop a plurality of light and dark patterns from the output of the sensor. As the front-edge portion moves past the preselected location of the sensor 14, the apparatus will perform the edge-position control (EPC) method to match a coordinate of the single, constant-edge portion with the coordinate for the rear-edge portion that may have preceded the front-edge portion now passing the sensor 14.

Figure 4A:
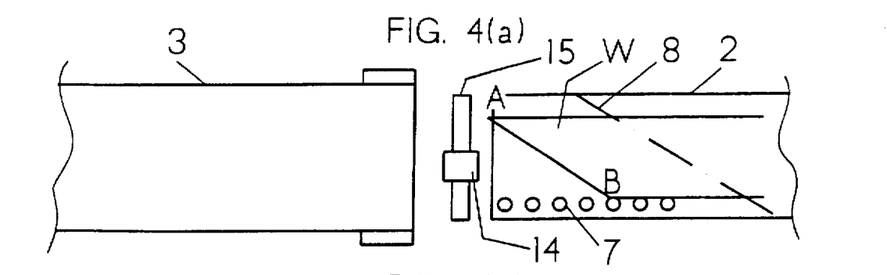
FIG. 4, containing Subfigures 4(a)–4(e) schematically shows the control-centering process carried out by the embodiment of FIG. 1.
Figure 4B:
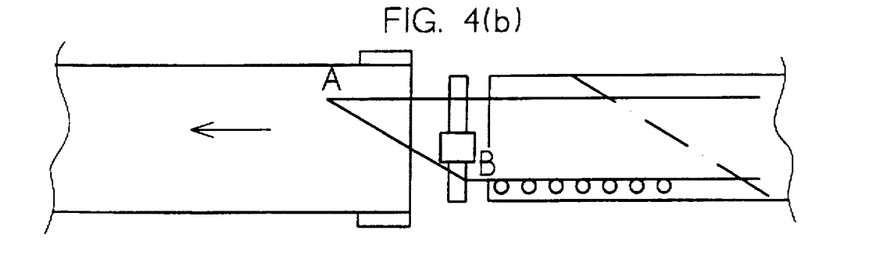
Figure 4C:
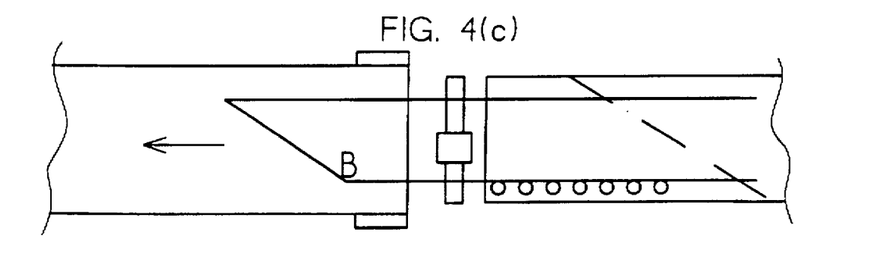

It is also possible to set information in advance on the width of the material in the controller 17 by selecting the code number of the material at the initial passing of such material through the image sensor 14. It is also possible to manually move the conveyor to start the material close to the center position thereof. After the material is moved into the tray 3 for attachment and the point B in Subfigure 4(a) reaches the location of the sensor 14, the coordinate data increase on the side previously cut away is converged with the preselected value. At this time, the control method is automatically switched to the center-position control (CPC) method which measures the position coordinates of both edges of the material, so that the center position of the conveyor and the material thereon can be calculated. This is shown in Subfigures 4(b) and 4(c).

Figure 4D:
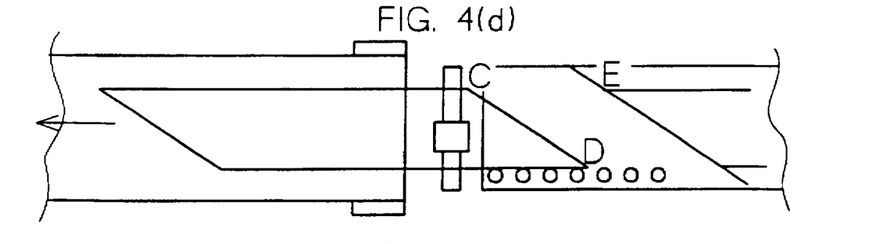
Figure 4E:
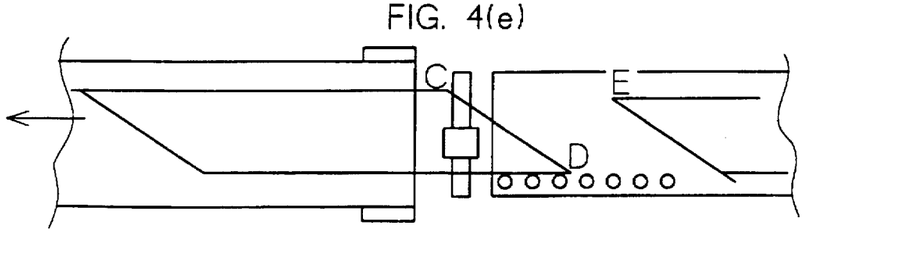

In Subfigure 4(d), a point C is reached which is the beginning of the rear-edge portion of the material. This rear-edge portion extends from point C to point D.

Once the point C has reached the sensor 14, the decrease in the data of the coordinates on the side that has been cut off becomes more than the preselected value and the control method is automatically switched to the EPC method, having a standard value on the one side available. The standard value used at this time uses the coordinate data around the final position of the section controlled by the CPC method to control up to the point D of Subfigure 4(d).

The standard value used when the EPC method for the next material starts from the point E is the coordinate position near the position C at the rear-edge portion of the previous material.

Accordingly, when the control methods are switched between the EPC and CPC methods, based on the data calculated at the image sensor 14, it is a good idea to set the conveyor-feeding speed to a relatively low speed to reduce errors. However, if the information on the width, cutting angle, and the length of the material is already registered in the controller 17 to switch each control method according to the feeding rate of the conveyor, it is possible to increase the feeding rate of the conveyor.

In this embodiment, the alignment of one edge of the material can be obtained by the second guide roller 7. Also, based on the information relative to the position and the width of the material measured by the sensor 14, the material can be conveyed to the adhesive belt or tray 3 for attachment so that the center position of the material is matched on the centerline of the belt drum utilized for the tray 3.

Figure 5:
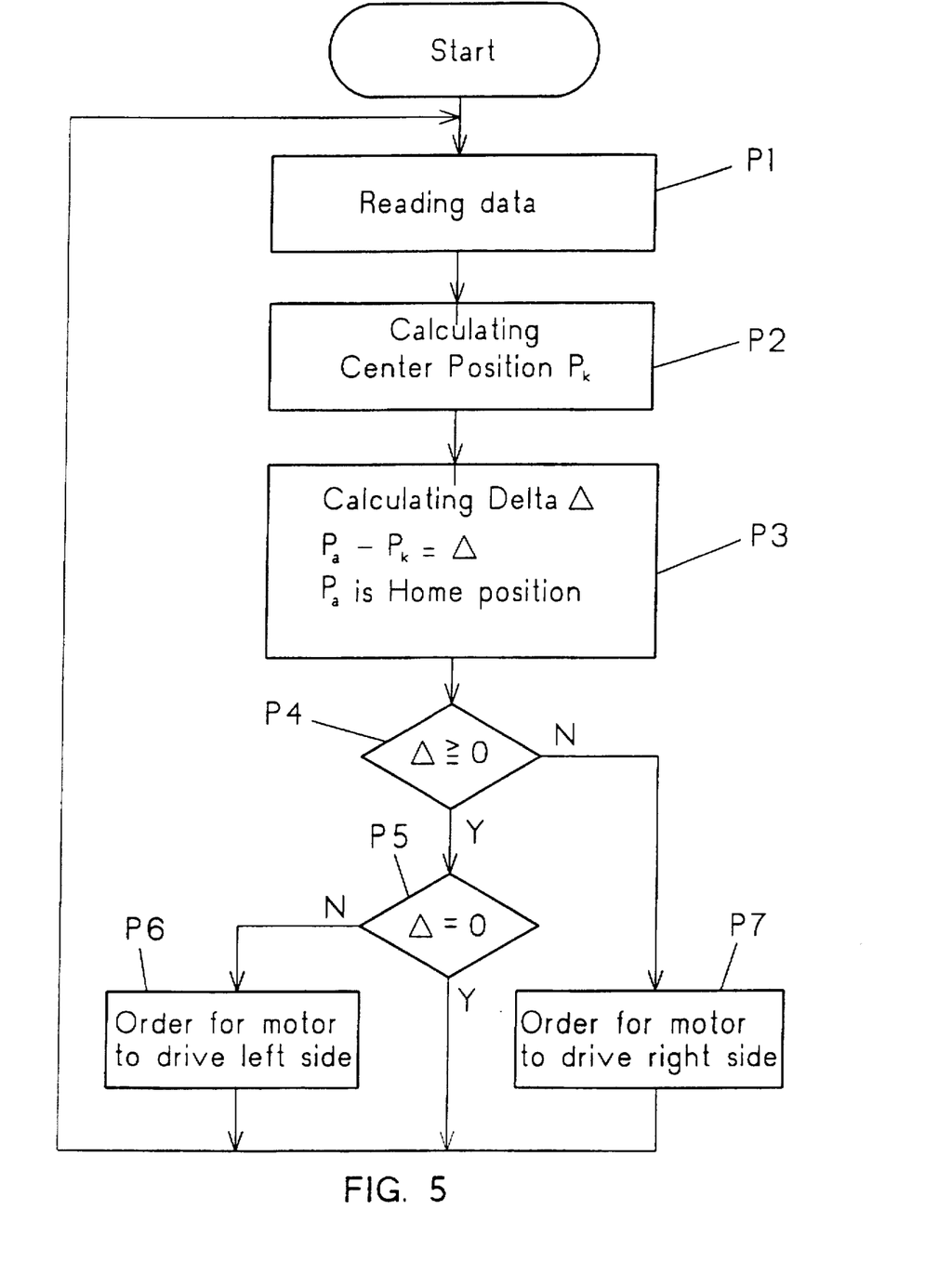
FIG. 5 is a flow diagram showing the method used by the apparatus of FIG. 1.

Referring now to FIG. 5, the flowchart shown therein illustrates the method incorporating the principles of the present invention. As previously mentioned, the controller 17 drives the centering conveyor 2 in the horizontal direction along the shaft 4, according to the flow control illustrated in FIG. 5. In this way the center position of the material will be aligned with the centerline of the feeder belt drum. At step P1 of FIG. 5, the light-dark-light data seen by the image sensor 14 is read and the controller 17 calculates the center position $P_k$ of the dark section at step P2. The next step is to calculate the deviation $\Delta$ between $P_k$ and the value predetermined at the step P3 (the home position $P_a$). At step P4, it is then determined whether the deviation $\Delta$ is zero or larger, or not.

If the deviation $\Delta$ is not zero or larger, the controller 17 sends an order to the servomotor 11 to drive the right side at step P7 and will control such movement without interruption until the deviation $\Delta$ equals zero.

On the other hand, if the deviation $\Delta$ is zero or larger, the controller 17 will determine at step P5 whether the deviation $\Delta$ equals zero or not. If the deviation $\Delta$ is not zero, the controller 17 will send an order to the servomotor 11 to drive the left side at the step P6 and will control such movement without operation until the $\Delta$ again equals zero. When the deviation $\Delta$ equals zero, the controller 17 continues to control.

By adjusting the image sensor 14 at the time of machine installation, the positions to be mechanically adjusted are eliminated, other than the positioning of the width of the second guide roller 7. This eliminates changing the mounting position for the sensor, which was conventionally required and again checking the mounting angle.

This increases the precision and lowers the possibility of decreased position. Furthermore, this arrangement eliminates the necessity for cleaning the photodetector elements or any reflection plate and the like which, as noted above, was frequently required in conventional apparatus. Accordingly, the apparatus incorporating the principles of the present invention is very easy to maintain.

Note that the sensor 14 faces downward so that the surface will rarely catch any dust. At the lower side exit, the light source 15, even if there is more or less dust, is not a problem as long as the photodetector element can recognize the light and dark portions.

The method and apparatus incorporating the principles of the present invention can be used for many applications. For example, it can control the upstream process of the material and improve quality control thereof by monitoring the data measured relating to the material width. It could also be used effectively as means for detecting any material that is off-center by a substantial amount.

Also, if any system malfunction occurs, the method and apparatus incorporating the principles of the present invention can note this by the monitoring function since one can quickly realize when the material has a width which exceeds the maximum possible width set in the controller.

Note that it is not necessary using this system to adjust the original point through which the material moves or to move the mounting position of the sensor mechanically. It is possible to make such arrangements electrically, if necessary. It is also possible to adjust the conicity force (COF) which is the lateral force that is based on the difference in the belt circumference length of the right and the left side of the tire.

Utilizing the principles of the present invention, the entire width of the material can be detected and controlled without interruption. Stable precision for centering a material is provided. Furthermore, because it does not require a mechanical changing of the position of the detection means when the materials are changed, the possibility of decreased precision in measurement is quite low. Thus, the centering apparatus is exceedingly easy to maintain.

Various modifications will become possible for those skilled in the art after receiving the benefit of the teachings of the present disclosure without departing from the scope thereof.

What is claimed is:

1. A method for centering material on a belt feeder having a center position, said material having side edges and a front-edge portion, comprising the steps of:

moving said material along a desired path on said belt feeder;

measuring the width of said front-edge portion of said material at a preselected location along said path using edge-position control as said material is moved along said feeder;

measuring the position coordinates of both side edges of said material at said preselected location using center-position control after said front-edge portion has moved past said location;

calculating the center position of said material based on said position coordinates; and moving said material in a direction to have said center position of said material coincide with said center position of said belt feeder, if necessary.

2. A method, as claimed in claim 1, wherein said material has a rear-edge portion and the width of said rear-edge portion is measured at said preselected location using edge-position control when said rear-edge portion reaches said location.

3. A method, as claimed in claim 1, wherein the width of said front-edge portion of said material increases as the material is moved along said path.

4. A method, as claimed in claim 2, wherein the width of said rear-edge portion of said material decreases as the material is moved along said path.

5. Apparatus for centering material on a belt feeder having a center position, said material having side edges and a front-edge portion, said apparatus comprising:

conveyor means for moving said material along a desired path on said belt feeder;

means for measuring the width of said front-edge portion of said material at a preselected location along said path using edge-position control as said material is moved along said feeder;

means for measuring the position coordinates of both said edges of said material at said preselected location using center-position control after said front-edge portion has moved past said location;

means for calculating the center position of said material based on said position coordinates; and means for moving said conveyor in a direction to have said center position of said material coincide with said center position of said belt feeder, if necessary.

6. Apparatus, as claimed in claim 5, wherein said material has a rear-edge portion and wherein means are included for measuring the width of said rear-edge portion at said preselected location when said rear-edge portion reaches said location.

7. Apparatus, as claimed in claim 5, wherein the width of said front-edge portion of said material increases as said material is moved along said path.

8. Apparatus, as claimed in claim 6, wherein the width of said rear-edge portion of said material decreases as said material is moved along said path.

9. Apparatus, as claimed in claim 5, wherein a material cutter is arranged along said path on said belt feeder, said cutter having an entry side and an exit side;

first guiding means arranged at said entry side of said cutter for centering said material on said belt feeder; and second guiding means arranged at said exit side of said cutter for aligning at least one of said side edges of said material along a predetermined path.

10. Apparatus, as claimed in claim 9, wherein said first guiding means includes a plurality of rollers, at least one of which respectively contacts each of said side edges of said material; and said second guiding means includes at least one roller which contacts at least one of said side edges of said material.

11. Apparatus, as claimed in claim 5, wherein said means for measuring the position coordinates of both said edges of said material includes an image sensor arranged at said preselected location.

* * * * *